CAPACITIVE NOISE CANCELLATION IN A MAGNETIC MEMORY SYSTEM

Filed Dec. 30, 1963 2 Sheets-Sheet 1

INVENTORS
NORBERT G. VOGL, JR.
QUINTON W. SIMKINS
BY Maurice H. Klitzman

CAPACITIVE NOISE CANCELLATION IN A MAGNETIC MEMORY SYSTEM

Filed Dec. 30, 1963 2 Sheets-Sheet 2

3,325,793
Patented June 13, 1967

3,325,793

CAPACITIVE NOISE CANCELLATION IN A MAGNETIC MEMORY SYSTEM

Quinton W. Simkins, Poughkeepsie, and Norbert G. Vogl, Jr., Albany, N.Y., assignors to International Business Machines Corporation, New York, N.Y., a corporation of New York Filed Dec. 30, 1963, Ser. No. 334,278
7 Claims. (Cl. 340—174)

The subject invention relates to improved magnetic memory systems and, more particularly, to magnetic memory systems wherein undesirable noise signals are cancelled.

Information storage systems employing magnetic elements have become relatively commonplace in the data processing industry. Such systems employ individual magnetic elements having two stable states to store binary information; one stable magnetic state representing a binary one, while a second stable state represents a binary zero. Switching of the magnetic elements in order to represent a given bit of information is conventionally accomplished by applying currents to drive windings inductively coupled to the elements. Commonly two drive windings are required; a word drive and a bit drive. In ferrimagnetic memories, the magnetomotive force developed by current passing through both the word drive and the bit drive is sufficient to exceed the coercive force of the magnetic element. If the memory elements are thin films of a ferromagnetic material like Ni-Fe, a different switching operation takes place. Current passing through both a word drive line and a bit drive line switches a magnetic dipole (representing the magnetization of an element) to an unstable state; the dipole will be nearer to one stable state than another. Upon removal of the currents the dipole will fall into the nearer state, thereby storing a bit of information in the element. A fuller explanation of switching thin films of ferromagnetic material may be found in U.S. Patent 3,054,094, "Magnetic Shift Register," which issued on Sept. 11, 1962 and is assigned to the same assignee as the instant application. A memory system employing thin films of ferromagnetic material is described in: A. J. Meyerhoff, Digital Applications of Magnetic Devices, New York, John Wiley and Sons, Inc., 1960, pages 440–1. Such magnetic elements may also be interrogated to determine the binary bit of information stored therein (a given bit of binary information corresponds to a given stable magnetization state). Induced voltages resulting from switching the magnetic element upon interrogation are the keys to the entire sensing scheme. It is the polarity of these voltages that is sensed. Should the magnetic element already be in a given state, currents tending to drive the element into that state will produce no change in the magnetization state and no induced voltage will be created and sensed. However, should the magnetic element be in the opposite state, driving of the element will create an induced voltage which may be sensed by a conventional apparatus. Since such driving of the magnetic element may destroy the information stored therein, it is necessary to follow the interrogation operation with a rewrite cycle so as to restore the magnetic elements to their presensed state.

The utility and value of magnetic storage systems of the general type set forth above has been conclusively demonstrated in the data processing industry. However, with all the attendant advantages to such a system, there are still unsolved problems and resultant disadvantages. Such systems necessarily require a number of windings for carrying the necessary currents to all points of the system. With the driving current pulses scurrying in many directions within the system and with a multiplicity of induced voltages floating through the components, it is natural to expect an electrical noise problem to be present. Such is the case, and it becomes increasingly difficult for prior art apparatus to separate the desired sense signals from the undesired noise signals generated within such a system. Prior art systems have relied on noise in one part of the system cancelling noise in another part. Other prior art systems have used clipping techniques. None of these have been entirely satisfactory.

Accordingly, it is an object of this invention to provide an improved magnetic memory system wherein the signal to noise ratio is significantly greater than in prior art magnetic memory systems.

It is a further object of this invention to provide an improved magnetic memory system employing fewer windings than those of the prior art while still retaining the function of those windings eliminated.

Still another object of this invention is to provide an improved magnetic memory system wherein noise cancellation is effected.

A more particular object of this invention is the provision of such a magnetic memory system wherein capacitive noise is cancelled.

Still another object of this invention is the provision of an improved magnetic memory system wherein a common dual winding is used for conveying bit drive currents as well as for sensing signals.

Yet another object of this invention is the provision of an improved magnetic memory system wherein unipolar drive circuitry employed with a common bit-sense winding provides bipolar bit drive currents.

It is still another object of this invention to provide a magnetic memory system wherein balanced word drive line noise coupling is achieved through bipolar circuitry.

Briefly, stated, and in accordance with one aspect of the invention, a novel winding for a magnetic memory array is provided. The novel winding requires that two conductors in parallel displacement pass through each magnetic field surrounding each magnetic element of the memory itself. The magnetic element may have any geometry; e.g., it may be toroidal, cylindrical, planar, etc. It may also be a ferrimagnetic or a ferromagnetic material, like Ni-Fe. A differential sense amplifier is provided to terminate one end of both conductors; the opposite ends of the same conductors are terminated in their characteristic impedance. A differential sense amplifier senses the difference in either magnitude or polarity of pulses applied to opposite sides of the amplifier. In other words, a pulse arriving at one side of the amplifier is inverted and added to a pulse arriving at the other side of the amplifier so as to provide an output when the pulses differ in either polarity or amplitude. Should the pulses be equal in both magnitude and polarity, no output will be obtained from the sense amplifier. When current is passed through the word drive conductor associated with each magnetic element in order to sense the state of each said element, both a signal and a noise voltage are induced on the conductor threading such magnetic element. The noise voltages are equal in polarity and amplitude and propagate along each of said conductors. Accordingly, the noise voltages arrive approximately simultaneously at opposite sides of the differential sense amplifier; being equal in polarity and amplitude, they effectivey cancel out. However, different factors are present in respect to the signal voltages. The signal voltages induced on the conductors will be equal in amplitude but the polarity of these voltages on one side of the magnetic elements will differ from that on the other. Accordingly, these voltages also propagate down both conductors and arrive at opposite sides of the differential sense amplifier. Being equal in amplitude, but opposite in polarity, a strong signal will result when the one signal is inverted and added to the other. Thus, it can be seen that the noise voltages are cancelled out by the apparatus set forth herein, while the signal voltages are added to provide a strong output signal.

In accordance with another aspect of the invention, the above described apparatus can be employed not only for sensing the magnetic elements, but also for writing information into the magnetic elements if a few more components are added. Essentially, connecting a unipolar bit driver to each of the two conductors passing through the magnetic field of each element is sufficient to accomplish this dual function. The two conductors can then serve as a common bit-sense winding. Each of the conductors is split into two parallel branches, and each branch passes through the magnetic fields surrounding half the total number of magnetic elements. Further, each parallel branch of a given conductor terminates at the opposite side of a differential sense amplifier. Each unipolar bit driver provides a bit drive pulse flowing in the same direction to a pulse available from the other unipolar bit driver. Each unipolar bit driver is connected to one of the two conductors. Writing information into a given magnetic element is accomplished by simultaneously passing current through a word drive conductor associated with that element and through one of the two bit-sense windings. The combined magnetomotive force at the selected magnetic element is sufficient to switch that element. The bit drive pulses have traveled down both branches of the conductor and arrived at opposite sides of the differential sense amplifier. Bit drive pulses, being equal in polarity and amplitude, will be cancelled at the differential sense amplifier. Bit drive noise is thereby eliminated. Sensing a magnetic element is accomplished in the same manner as in the apparatus first described. Rewriting the information into a sensed magnetic element takes place by allowing current to flow once again from the unipolar bit driver activated during the original write cycle simultaneous to pulsing of the word drive line. The interrogated magnetic element is thereby restored to its original magnetic state. An opposite bit of binary information could originally have been stored in the element by activating the other bit driver so as to switch the element into an opposite stable state. Rewrite would then be effected by activating the other bit driver also. Bipolar bit driving with simple unipolar circuitry is thereby available with this apparatus.

Still another embodiment of the invention utilizes a common bit-sense winding, coupled with a symmetrical arrangement of magnetic elements, to achieve an essentially noise free system. In that embodiment, the magnetic elements are divided into two groups, each group being physically symmetrical to the other group. A first common bit-sense winding passes from a bipolar bit driver in serial fashion through the magnetic elements of a first group; it then continues in parallel to one side of a differential sense amplifier and through the magnetic elements of the second group. A second common bit-sense winding passes from its associated bipolar bit driver serially through the magnetic elements of the second group, and then in parallel to a second side of the differential sense amplifier and through the magnetic elements of the first group. Each bit-sense winding terminates at an opposite side of the differential sense amplifier. Thus, sensing of a selected magnetic element in such an array will operate on the basic principles set forth above and noise cancellation, coupled with sense signal addition, will readily be obtained. However, in order to write information into a magnetic element with the apparatus described, it is necessary to provide current flowing on both bit-sense windings threading the array, together with current flowing on a single word drive line passing over the magnetic element to be selected. Thus, addition of three components at a given magnetic element is necessary to switch the element in this embodiment. The bit drive pulses sent out on the respective bit-sense windings will be equal in magnitude and polarity; they therefore will cancel at the differential sense amplifier. The particular wiring arrangement of this embodiment may be represented schematically by a conventional DC bridge circuit.

All three embodiments of this invention set forth above have certain common advantages. Among the most prominent advantages is the greatly enhanced signal to noise ratio of the magnetic memory array. This feature flows from the addition of the sense signals and cancellation of noise signals. Further, the fabrication of magnetic memories employing these techniques will be simplified in that a common winding may be used for both bit driving purposes and for sensing. Such magnetic memory arrays should be cheaper as well as easier to fabricate. One embodiment of the subject invention offers the advantages of bipolar operation with simple unipolar circuitry. A second embodiment of the invention provides the electrical equivalent of a bridge circuit so as to afford even more certainty that undesirable noise voltages will be cancelled.

The foregoing and other objects, features and advantages of the invention will be apparent from the following more particular description of preferred embodiments of the invention as illustrated in the accompanying drawings.

Figure 4:
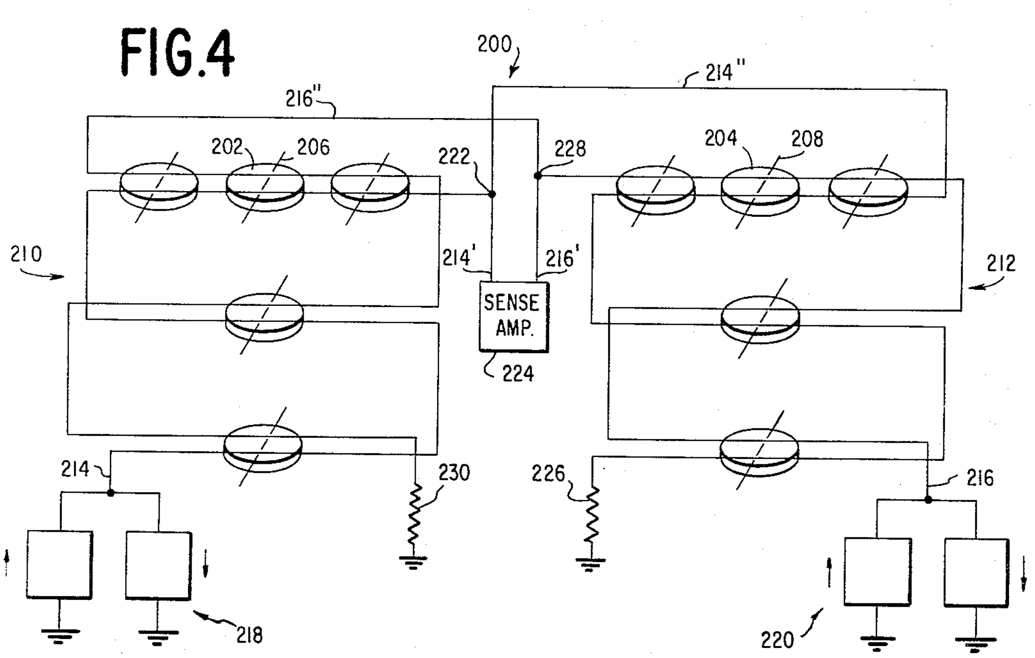
FIG. 4 shows a symmetrical arrangement of components employing the common bit-sense winding of the subject invention.
Figure 5:
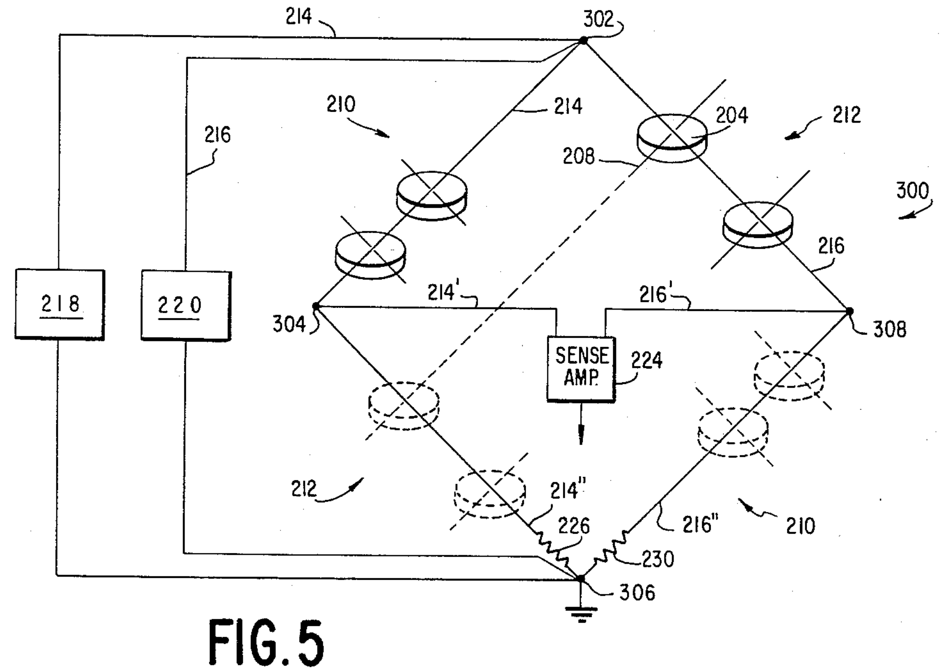

FIG. 5 schematically represents the bridge circuit characteristics of the apparatus set forth in FIG. 4.

Prior to entering upon a description of certain embodiments representative of this invention, it should be noted that the invention may be practiced with ferrimagnetic elements, as well as ferromagnetic elements. It is however especially suited for use with memory systems employing ferromagnetic elements and orthogonal windings. Therefore, the following embodiments will be described with reference to memory systems employing ferromagnetic elements.

Figure 1:
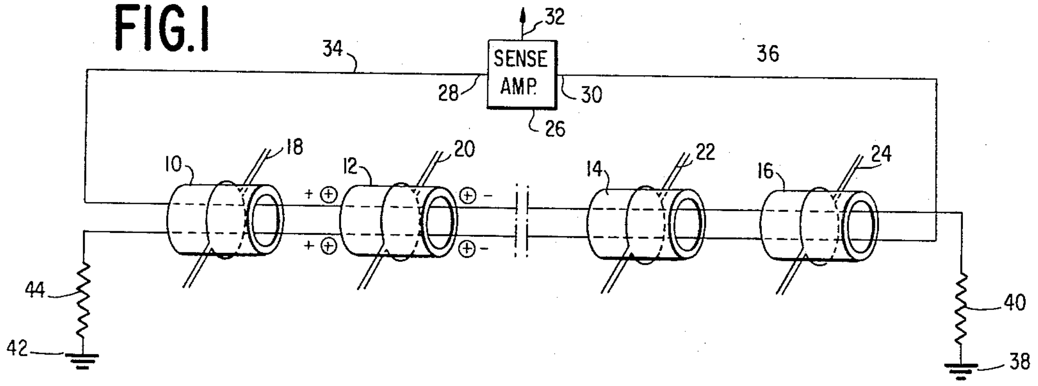
FIG. 1 shows the basic component arrangement to effect noise cancellation within a magnetic memory array.

Referring generally to FIG. 1, a typical arrangement for sensing magnetic memory elements with resultant noise cancellation is set forth. A row of magnetic elements 10, 12, 14, 16 are set forth; elements 10, 12, 14, 16 are shown as being cylindrical in shape. However, this is merely by way of example and it should be remembered throughout the entire patent application that the subject invention will function equally as well with planar magnetic memory elements as with magnetic memory elements of any other shape (e.g., cylindrical, etc.). The invention will also function with ferrimagnetic as well as ferromagnetic elements like Ni-Fe. The differences in switching set forth previously should be noted, although the noise cancellation scheme remains the same. Word drive conductors 18, 20, 22, 24 pass over their associated magnetic elements. A differential sense amplifier 26, having input terminals 28 and 30 respectively on opposite sides of said differential sense amplifier, is shown. Output terminal 32 is also present on differential sense amplifier 26. A plurality of conductors 34, 36 pass through each magnetic element 10, 12, 14, 16. Each conductor 34, 36 terminates at an opposite side of differential sense amplifier 26. Conductor 34 travels from ground potential 38, through its characteristic impedance 40, and then through magnetic elements 10, 12, 14, 16 to terminal 28 on sense amplifier 26. In like manner, conductor 36 travels from ground potential 42 through its characteristic impedance 44 and then through magnetic elements 10, 12, 14, 16 to terminal 30 of sense amplifier 26.

In operation, the apparatus at FIG. 1 will be used to sense the information contained within a selected one of said magnetic elements. By way of example, consider sensing magnetic element 12. By way of further example, consider that element 12 is of a ferromagnetic material. A current is passed through word drive conductor 20 so as to drive magnetic element 12 into an unstable magnetic state. Such a current pulse may, by way of example, be of 700–800 ma. with a voltage of 15–20 v. A typical rise time may be 20 nanoseconds measured from the 10% to 90% points. However, there is also a capacitance established between conductor 20 and each sense conductor 34, 36. Since the capacitance is equal, equal noise voltages are developed on both conductors 34, 36. These noise voltages will be equal in both polarity and amplitude. Their polarity is determined by the direction of current flow through word drive conductor 20. By way of example, their presence is represented by the encircled plus signs. The noise voltages will propagate along conductors 34, 36 in both directions and arrive at terminals 28, 30 respectively of sense amplifier 26. Upon their arrival, sense amplifier 26 will determine any difference between the two pulses. This is accomplished in a conventional manner; that is, a pulse arriving at terminal 30, for example, will be inverted and added to the pulse arriving at terminal 28. These two pulses, initially being equal in amplitude and polarity, will, upon inversion and addition of one to another, yield no output. The latter condition is the theoretical optimum. In actual practice, the pulse on line 34 will arrive slightly before the pulse traveling down line 36 due to the greater distance of travel along conductor 36. So long as the delay is not greater than some reasonable value (e.g., 10% of the rise time of the noise voltage) a high degree of efficiency will be obtained from the apparatus described in that the signal to noise ratio will be high.

So far, the generation of noise voltages within the apparatus of FIG. 1 has been explained and their subsequent cancellation verified. The apparatus of FIG. 1, however, is also capable of determining the presence or absence of a sense signal on windings 34, 36. Continuing the explanation of the previous paragraph, and given the fact that magnetic element 12 is initially in the nondesired driven state, current flowing through word drive conductor 20 will switch the magnetic state of element 12. The resultant flux change about magnetic element 12 will induce a strong voltage in both conductors 34 and 36, these conductors being within the magnetic field surrounding element 12. Like the noise voltages, the signal voltages induced on conductor 34, 36 will be equal in amplitude; unlike the noise voltages, the signal voltages induced on conductors 34, 36 will be of one polarity on one side of element 12 and of an opposite polarity on the other side of element 12. By way of example, the polarity of the signal voltages on either side of element 12 are shown by the noncircled plus and minus signs. Thus, a sense signal of positive polarity could be propagated along conductor 34 and arrive at terminal 28 of sense amplifier 26. Simultaneously, a sense signal of negative polarity could be propagated along conductor 36 and arrive at terminal 30 of sense amplifier 26. These two pulses, being equal in amplitude but opposite in sign, would, upon inversion of one and addition to the other, result in a strong output signal. The output signal on terminal 32 of sense amplifier 26 would essentially be twice as strong as the sense signal developed within the apparatus.

The basic apparatus necessary to provide an increased signal to noise ratio for sensing a magnetic element array has been set forth in FIG. 1. The sense signals are added and the noise signals are effectively cancelled.

Figure 2:
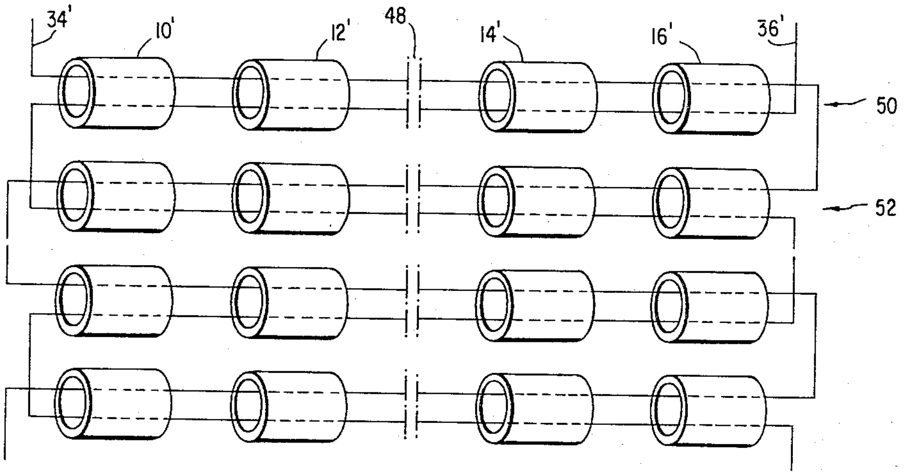
FIG. 2 shows an extension of this principle to a magnetic memory array having a plurality of rows of magnetic elements.

Continuing on to FIG. 2, an extension of the basic apparatus set forth in FIG. 1 is shown. Note that the first row of magnetic elements in FIG. 2 would correspond to the single row of magnetic elements in FIG. 1; accordingly, the elements in FIG. 2 are numbered 10′, 12′, 14′, 16′. The break at point 48 at the center of row 50 indicates that the number of magnetic elements in a single row may be extended to any reasonable number. The number chosen depends upon the particular application and is determined by such factors as desired speed of output, strength of signal output, value of signal to noise ratio, etc. and is to a great extent determined by the ancillary equipment utilized within the memory complex. The invention could be utilized in a memory array having "n" rows, of which rows 50, 52, 54, 56 are merely discrete rows. The sense conductors threading 50, 52, 54, 56 are equivalent to those set forth in FIG. 1 and accordingly are labeled 34′, 36′. Folding the conductors back upon each other as shown in FIG. 2 tends to reduce the delay time difference on the two sense conductors. Once the voltage signals leave a given row they each travel an equal length of conductor to the associated sense amplifier. However, considering signals developed about element 14′, it can be seen that the delay time on conductor 34′ equals the itme necessary to pass through one element (16′), while the delay time on conductor 36′ would be equal to the time necessary to pass through two elements (12′, 10′). The maximum difference in delay time with the apparatus of FIG. 2 would be equivalent to the delay time through a single row of magnetic elements (row 52, for example).

Figure 3:
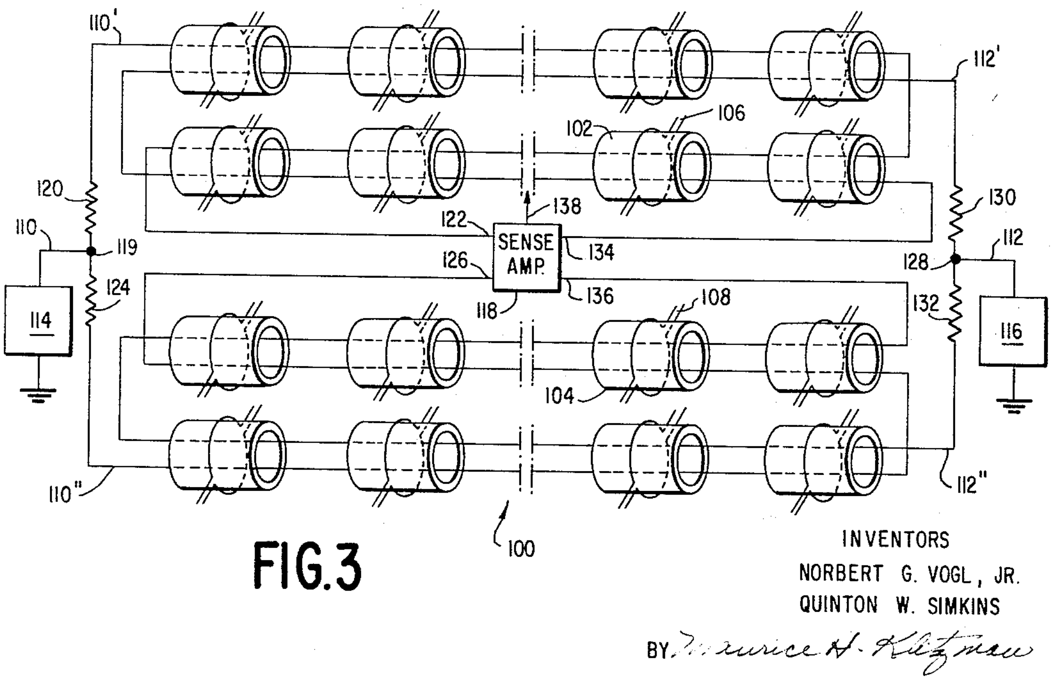
FIG. 3 shows the addition of certain circuitry to the basic winding scheme of FIG. 1 so as to enable that winding to serve as a bit drive winding as well as a sense winding.

Advancing to FIG. 3, an extension of the basic invention set forth in FIG. 1 is shown. This extension utilizes additional circuitry and enables the sense winding to be employed for an additional purpose. By the addition of unipolar bit drivers, the sense winding may now be employed as a bit drive conductor as well as a sense winding.

The structure shown in FIG. 3 comprises an array 100 of information storing magnetic elements, of which elements 102 and 104 are representative. Associated with each magnetic element is a word drive conductor; word drive conductor 106 passes over magnetic element 102, while word drive conductor 108 is similarly disposed to magnetic element 104. Two conductors 110, 112 link all the magnetic elements of array 100. Each conductor 110, 112 travels from an associated unipolar bit driver 114, 116 to a differential sense amplifier 118. Any unipolar bit driver available in the art may be utilized; for example, the one shown in FIG. 8*a* on p. 160 of the "Proceedings of the IRE," vol. 49, No. 1, January 1961. Looking at conductor 110 in more detail, it travels from unipolar bit driver 114 to junction 119 where it is split into two parallel paths 110′ and 110″. Path 110′ passes through impedance 120 and then seriatim through the magnetic elements in the upper half of array 100 until it terminates at terminal 122 of sense amplifier 118. Path 110″ leaves junction 119, passes through impedance 124, then seriatim through the magnetic elements in the lower half of array 100, and terminates at terminal 126 of sense amplifier 118. In a similar manner, conductor 112 is split at junction 128 into two parallel paths 112′ and 112″. Path 112′ travels from junction 128 through impedance 130 and then seriatim through the magnetic elements in the upper half of array 100 until it terminates at terminal 134 of sense amplifier 118. Path 112″ travels from junction 128 through impedance 132 and then seriatim through the magnetic elements in the lower half of array 100 unil it terminates at terminal 136 of sense amplifier 118. Unipolar bit driver 116 may also be of any type known to the art. A qualification does exist in that unipolar bit driver 116 must provide current flowing in the same direction to that provided by unipolar bit driver 114. Sense amplifier 118 should have an impedance of $Z_0$ so as to properly terminate conductors 110 and 112. Sense amplifier 118 has an output terminal 138.

The operation of the apparatus set forth in FIG. 3 may be clarified by realizing that ancillary decoding circuitry and selection circuitry of a type well known in the art would be utilized. With that in mind, it will be demonstrated that the apparatus of FIG. 3 can be used for both reading and writing information into any of the magnetic elements shown in array 100 and, by way of example, magnetic element 102. The stable state to which magnetic element 102 will be driven during the writing cycle is determined by the binary information to be stored therein, and is dependent upon the direction of bit drive current on path 112' or path 110'. Initially, magnetic element 102 is selected by pulsing word drive conductor 106. In synchronization thereto, and in accordance with the desired direction of bit drive current, one of the unipolar bit drivers 114 or 116 will be energized; for example, bit driver 116 will be energized. Thus, a pulse will travel down conductor 112 and path 112' through magnetic element 102. This pulse, by way of example, may be roughly 100 ma. to 200 ma. in value. The combined magnetomotive force generated by the pulse on conductor 106 and on 112' will be sufficient to switch magnetic element 102. An identical bit drive pulse has also been forced down path 112''. Both bit drive pulses will arrive simultaneously at terminals 134 and 136 of differential sense amplifier 118. Being equal in amplitude and polarity, the inversion of one, and subsequent addition thereof to the other, will result in their effective cancellation and no output will be present at the sense amplifier. The instant apparatus has thus driven a magnetic element and cancelled the effect of the bit pulses.

Having described the operational steps employed in writing a binary bit of information into a selected magnetic element in the apparatus of FIG. 3, interrogation of that same magnetic element will now be described. Suppose that a binary one is stored in magnetic element 102. Further, assume (as is the case) that an indication of this fact can be obtained by switching magnetic element 102 into an unstable state and sensing a resultant induced voltage. In order to switch magnetic element 102, current of sufficient amplitude will be passed through word drive conductor 106. As magnetic element 102 changes from one state to an unstable state, the changing magnetic field about said element will induce a voltage in path 112' of conductor 112 and path 110' of conductor 110; both a signal voltage will be induced, as well as a noise voltage. In a manner similar to the operation shown in FIG. 1, the noise voltages will be equal in amplitude and polarity on either side of magnetic element 102. They will propagate along path 110' and path 112' to terminals 122 and 134 respectively of sense amplifier 118. There, by inversion and addition of one to the other, the noise pulses will cancel. The signal voltages will be equal in amplitude, but the signal voltage leaving the left-hand side of element 102 will be opposite in polarity to that leaving the right-hand side of element 102. These voltages propagate along path 10' and 112' and arrive at opposite terminals 122, 134 of sense amplifier 118. Inversion of one and addition of that signal voltage to the other, will result in an output signal from sense amplifier 118 roughly twice as strong as either one of the input signals. The noise voltages have been minimized, if not cancelled, and the sense signal has been amplified to such an extent that the signal to noise ratio has been significantly increased.

Continuing on with reference to FIG. 3, it is noted that that read cycle immediately described has resulted in a destructive readout of the binary information contained in magnetic element 102. Therefore, it becomes necessary to restore element 102 to its pre-sensed state. This can be readily accomplished by the simple apparatus shown in FIG. 3. Unipolar bit driver 116 is activated again and bit drive pulses are propagated along conductor 112, traveling down path 112' and 112''. The bit drive pulse along path 112' arrives coincidentally at magnetic element 102 with the arrival of a current pulse on word drive conductor 106. The combined magnetomotive force switches element 102. Any capacitive noise pulses generated, as well as the bit drive pulses propagating along the parallel paths of conductor 112, will be effectively cancelled at differential sense amplifier 118 in accordance with the technique set forth before.

The operation of the impedances 120, 124, 130, 132, shown in FIG. 3 is essentially constant and its description has been postponed to this point. Having an understanding of the various pulses generated within array 100 during the read and write cycles, it is apparently desirable that signal and noise pulses generated in either the upper or lower half of array 100 should be restricted to that half. Accordingly, the impedances are provided so as to prevent a pulse generated in the upper half of the array, for example, from sneaking into the lower half of the array. Impedances 124, 132 serve this purpose, while impedances 120 and 130 serve a similar purpose for pulses generated within the lower half of the array.

In summary, then the apparatus of FIG. 3 has been delineated and its operation described. Essentially, FIG. 3 shows a magnetic memory array employing a common bit-sense winding, and utilizing unipolar bit drive circuitry to achieve bipolar operation.

Turning now to FIG. 4, another magnetic memory array 200 is shown. Array 200 comprises a plurality of magnetic elements, of which 202 and 204 are typical. Note that these elements are shown as having a planar shape. This is in reinforcement of the statement previously made that the subject invention set forth herein may be utilized with magnetic memory elements of essentially any shape; e.g., toroidal, cylindrical, planar, etc. Each magnetic element has a word drive conductor in a flux linked relationship with said element. Word drive conductors 206 and 208 are shown associated with magnetic elements 202 and 204 respectively. Array 200 is divided into two groups of magnetic elements 210 and 212. As shown, group 210 comprises five magnetic elements, and group 212 likewise comprises five magnetic elements. The geometrical arrangement of the magnetic elements in one group (210, for example) is symmetrical to that of the magnetic elements in the other group (212, for example). There are two windings 214, 216 traversing the magnetic elements of group 210 and group 212. A bipolar bit driver 218 is connected to conductor 214, while a similar bipolar bit driver 220 is connected to conductor 216. Any bipolar bit driver of a type well known in the art may be employed; for example, see the circuit shown in FIG. 13 on page 96 of "IRE Transactions on Electronic Computers," V. EC–8, No. 2, June 1959. Looking at conductor 214 in more detail, it passes from bipolar bit driver 218 through the magnetic elements of group 210 in a serial manner. At junction 222, it divides into two parallel paths 214' and 214''. Path 214' travels to one terminal of a differential sense amplifier 224. Path 214'' continues on through the magnetic elements of group 212 in a serial manner and then terminates in its characteristic impedance 226.

Conductor 216 threads the magnetic elements of array 200 in a manner bearing symmetrical similarities to that of conductor 214. More particularly, conductor 216 passes from bipolar bit driver 220 through the magnetic elements seriatim in group 212. At junction 228, conductor 216 splits into two parallel paths 216' and 216''. Path 216' travels to differential sense amplifier 224 and terminates at a different side of said differential sense amplifier than path 214' terminates. Path 216'' continues on through the magnetic elements of group 210 in a serial manner and terminates in its characteristic impedance 230.

Turning to the operation of the apparatus set forth in FIG. 4, it should be noted that both reading and writing information out of, and into, the magnetic elements may be performed so long as ancillary selection and decoding apparatus are provided; this apparatus is conventional in the art and will not be recited here. Taking the write cycle first, conductors 214 and 216 serve as bit drive windings. With reference to magnetic element 202 of group 210, by way of example, said element is selected for the storage of binary information by pulsing word drive conductor 206. At the same time, current is passed from bipolar bit driver 218 through conductor 214 in a direction which will set magnetic element 202 into the desired state of magnetization. Current additive to that present in conductor 214 flows from bipolar bit driver 220 through conductor 216 and, more particularly, path 216''. As the bit drive pulses on path 214 and 216'' pass over magnetic element 202, the resultant magnetomotive force is sufficient to switch element 202 into a desired state. The bit drive pulses are equal in polarity and amplitude. They are delivered to sense amplifier 224 by means of path 214' and 216'. At sense amplifier 224 the one pulse is inverted and added to the other, resulting in a bit drive pulse cancellation.

With continued reference to FIG. 4, sensing of a selected magnetic element would take place in a manner similar to that set forth previously. Namely, with reference to magnetic element 202, current would flow through word drive conductor 206. This current, being in a direction capable of driving magnetic element 202 from a stable magnetic state into an unstable magnetic state, results in a voltage signal being induced on conductor 214 and path 216''. The induced voltage signals would be in addition to the noise signal generated by current flowing through word drive conductor 206. As set forth previously, the noise signals on opposite sides of magnetic element 202 will be equal in polarity and amplitude. Traveling along the conductors 214 and 216'', which pass over magnetic element 202, they arrive at differential sense amplifier 224 where they are cancelled. The sense signals, resulting from the magnetic element 202 changing its state of magnetization, are equal in amplitude but different in polarity on either side of magnetic element 202. They also travel along conductors 214 and 216'' to sense amplifier 224 where, upon inversion of one and addition to the other, a combined sense output signal equal to approximately twice one of the original sense signals is present. The noise signals having effectively been cancelled and the sense signals having been added, it can readily be seen that a high signal to noise ratio has been obtained with the apparatus of FIG. 4. Restoring the information read out of magnetic element 202 would be accomplished in a conventional manner.

FIG. 5 shows schematically the equivalency of the apparatus set forth in FIG. 4 to a convention DC bridge circuit. Since FIG. 5 is a schematic representation of FIG. 4, similar numbers will be utilized to identify the elements of FIG. 5. Note also that the magnetic elements are shown as having a planar geometry in FIG. 5. However, cylindrical magnetic elements, for example, could be used with equal success. Conductors 214 and 216 are shown leaving boxes 218 and 220 respectively representing bipolar bit drivers 218 and 220. The magnetic elements of group 210 are shown as effectively being strung along opposite legs of the bridge circuit 300. It should be recalled that this is a schematic representation of how conductors 214, 216 pass through the groups 210, 212 of magnetic elements, and that each magnetic element does have two bit-sense conductors passing through its magnetic field. Thus, the magnetic elements of group 210 shown in dotted lines are truly the same as those elements of group 210 shown in solid lines. Similarly the magnetic elements of group 212 shown in dotted lines are truly the same elements as those labeled group 212 and shown in solid lines. For example, element 204 of group 212 is shown with its associated word drive conductor 208 on opposite legs of bridge circuit 300. Conductor 214 arrives at point 302 on the bridge circuit 300 and then travels through the magnetic elements of group 210 to point 304 on bridge circuit 300. The magnetic elements of group 212 are shown as noted on the remaining legs of bridge circuit 300. Path 214'', it will be recalled, passes through the symmetrical counterpart of the magnetic elements for group 210; namely, the magnetic elements in group 212. This is shown by path 214'' passing from point 304 on bridge circuit 300 through impedance 226 to point 306 and ground. In a similar manner, winding 216 is shown leaving box 220 and traveling to point 302 on bridge circuit 300. From point 302 winding 216 travels to point 308. It passes through the magnetic elements of group 212 on that leg of bridge circuit 300 and then effectively splits into parallel paths 216' and 216''. 216'' passes from point 308 to point 306 on bridge circuit 300 and traverses the magnetic elements of group 210. As noted, the two paths 214' and 216' are connected to a differential sense amplifier 224.

In operation, it should be remembered that, in accordance with the usual mode of a bridge circuit, the voltage drop from point 302 to point 304 will be exactly equal to the voltage drop from point 302 to point 308. Therefore, the voltages developed on the path 214' and 216' will always be equal in amplitude. Should they be noise pulses, they will be equal in polarity also and cancelled with certainty upon simultaneous arrival at differential sense amplifier 224. Should they be signal voltages, they will be opposite in polarity and essentially one will be added to another by differential sense amplifier 224. Thus, the symmetrical arrangement of the magnetic elements within groups 210 and 212, when coupled with the dual windings associated with each group, gives rise to the electrical equivalent of a DC bridge circuit and insures the development of voltage signals having equal amplitudes. Effective cancellation of noise voltages is optimized and the signal to noise ratio increased.

While the invention has been particularly shown and described with reference to preferred embodiments thereof, it will be understood by those skilled in the art that various changes in form and details may be made therein without departing from the spirit and scope of the invention.

We claim:

1. A noise cancellation scheme for magnetic memory systems comprising:

an element for storing information in one of two magnetic states;

means for switching said elements from one of said states to the other said state;

voltage signals induced when said element is switched, said voltage signals comprising a first and second information signal and and a first and second noise signal;

means coupled to said element for conveying said voltage signals away from said element; and means connected to said last-mentioned means for inverting said first noise signal and adding said inverted noise signal to said second noise signal so as to cancel said noise signals, and for inverting said first information signal and adding said inverted information signal to said second information signal so as to produce and amplified resultant information signal.

2. A noise cancellation scheme for magnetic memory systems comprising:

a magnetic memory element having a magnetic field thereabout;

means for switching said magnetic element from one magnetic state to another;

a differential sense amplifier for providing an output when said magnetic memory element has been switched from one magnetic state to another;

a first and second conductor disposed within said magnetic field;

voltage signals induced on said conductors when said magnetic element is switched;

each said conductor being connected to a different side of said differential sense amplifier and conveying said induced voltage signals to said differential sense amplifier, said differential sense amplifier cancelling signals equal in polarity and amplitude and adding signals differing either in polarity or amplitude.

3. Sensing apparatus for a magnetic memory of the type set forth in claim 2 wherein said magnetic memory element has a planar shape.

4. A noise cancellation scheme for magnetic memory systems comprising:

a plurality of information storing magnetic elements having two stable magnetic states;
a magnetic field about each said magnetic element;
word drive conductors passing through each said magnetic field;
a pair of bit driver circuits, each said bit driver circuit providing current flowing in the same direction to that of current provided by the other said bit driver circuit;
a pair of bit-sense windings, passing within each said magnetic field, each bit-sense winding connected to an associated one of said bit driver circuits and having two legs, one of said legs passing seriatim through a first group of said magnetic fields and the other of said legs passing seriatim through a second group of said magnetic fields;
voltage signals induced on said bit-sense windings when said magnetic elements are switched;
a differential sense amplifier for providing an output when one said magnetic memory element has been switched from one magnetic state to another;
each said leg of each said bit-sense winding terminating at said differential sense amplifier, one said leg of one said bit-sense winding being connected to a first side of said amplifier, and the other said leg of the same said bit-sense winding being connected to a second side of said sense amplifier, so that signals present on a given one of said legs will be inverted and added to signals on the other of said legs by said sense amplifier, and further each said leg of each said bit-sense winding is connected to a side of said differential sense amplifier opposite to that connecting a symmetrical leg of the other said bit-sense winding.

5. A magnetic memory system of the type set forth in claim 4 wherein said magnetic elements are of a substantially planar shape.

6. A noise cancellation scheme for magnetic memory systems comprising:

a first and second group of information storing magnetic elements having two stable magnetic states, said elements in said first group being arranged in a pattern symmetrical to that of said elements in said second group;
a magnetic field about each said magnetic element;

word drive conductors passing through each said magnetic field;
voltage signals induced when one said magnetic element is switched;
a first and second bit driver circuit, each said bit driver circuit capable of providing current flow in either of two directions, but operated so that currents flowing from said first bit driver circuit will be in the same direction as current flowing from said second bit driver circuit;
a differential sense amplifier for providing an output when one of said magnetic elements has been switched from one magnetic state to another;
a first and second bit-sense winding passing within each said magnetic field, said first bit-sense winding connected between said first bit driver circuit and ground, said first bit-sense winding passing seriatim from said first bit driver circuit through said magnetic fields of said first group of magnetic elements and then in parallel to both a first side of said differential sense amplifier and through said magnetic fields of said second group of magnetic elements to ground, said second bit-sense winding connected between said second bit driver circuit and ground, said second bit-sense winding passing seriatim from said second bit driver circuit through said magnetic fields of said second group of magnetic elements and then in parallel to both a second side of said differential amplifier and through said magnetic fields of said first group of magnetic elements to ground, so that one said induced voltage signal on said first bit-sense winding will be inverted and added to another said induced voltage signal on said second bit-sense winding by said differential sense amplifier resulting in an output from said differential sense amplifier when said signals are not equal in polarity and amplitude and no output when said signals are equal.

7. A magnetic memory system of the type set forth in claim 6 wherein said information storing magnetic elements are substantially planar in shape.

References Cited

UNITED STATES PATENTS

| | | |
|---|---|---|
| 3,112,470 | 11/1963 | Barrett et al. |
| 3,208,054 | 9/1965 | Kaiser et al. |

BERNARD KONICK, *Primary Examiner.*

R. MORGANSTERN, *Assistant Examiner.*